NEGATIVE RESISTANCE AMPLIFIERS

Filed Aug. 1, 1952

INVENTORS: W. P. MASON
W. SHOCKLEY
BY N. S. Ewing
ATTORNEY

United States Patent Office 2,775,658

Patented Dec. 25, 1956

2,775,658

NEGATIVE RESISTANCE AMPLIFIERS

Warren P. Mason, West Orange, and William Shockley, Madison, N. J., assignors to Bell Telephone Laboratories, Incorporated, New York, N. Y., a corporation of New York Application August 1, 1952, Serial No. 302,278

4 Claims. (Cl. 179—171)

This invention relates primarily to electrical circuits employing negative resistance and it has as one of its principal objectives an improvement in the electrical stability of such circuits.

Many circuits have been proposed heretofore in which negative resistance is employed to cancel, effectively, some of the positive circuit resistance and thereby to secure one desirable effect or another. Negative resistance elements have been used in wave transmission circuits, for example, to serve as so-called booster amplifiers of the transmitted waves. The amplification or other effect is greater the more nearly the negative resistance cancels the positive resistance, but instability or oscillation will occur if the negative resistance becomes equal to or greater than the positive resistance. It has been necessary to forego close balance of negative and positive resistances to allow margin for inconstancy of either the negative resistance itself, or the resistance of the associated circuits. These latter variations may, incidently, be radical in such cases as the opening and closing of telephone circuits in switching operations. This accounts in part for the rare use of the simpler two-terminal or elemental negative resistance elements and the more widespread use of the well known four-terminal conventional vacuum tube amplifier, up to the present time.

More specific objects, then, are to allow a close balance between positive and negative resistance, to achieve a higher margin against instalibity, and to allow easier tolerances on the positive and negative resistance elements.

In alternating current circuits there may be reactive components which restrict the benefit or amplification from negative resistance even when the reactive component is unchanging, and a further object is to overcome this restriction.

Still another object of this invention is to provide a simple, inexpensive electrical transducer which will readily pass alternating current in one direction but not in the other, and which has a broad frequency characteristic, to be used in combination with sensitive electric components such as negative resistance elements.

In accordance with the invention, the objects mentioned and others which will be developed are attained by associating passive non-reciprocal transmission networks with negative resistance elements or other sensitive electrical components in such manner that the effects of impedance variations in one part of the circuit are isolated from the other parts, and the unstabilizing effects are reduced. More specifically, the invention contemplates the interposition between the negative resistance element and associated elements of inconstant impedance, a non-reciprocal circuit unit having directionally asymmetric characteristics.

A feature of the invention lies in the use of a plurality of negative resistance elements alternated with non-reciprocal networks of the type noted above, to create a stable high gain amplifier.

An additional feature of the invention lies in the combination of an unstable or variable electrical impedance with a non-reciprocal circuit unit having directionally asymmetric characteristics which is simple, passive, stable and has a broad frequency response.

The nature of the present invention and various objects, features, and advantages in addition to those pointed out above will appear more fully from the following description of the embodiments of the invention which are illustrated in the drawings.

Prior to entering on a detailed discussion of the drawings and a mathematical analysis of the factors involved, a cursory statement of the electrical elements and circuital units involved in this application will be set forth.

Figure 1:
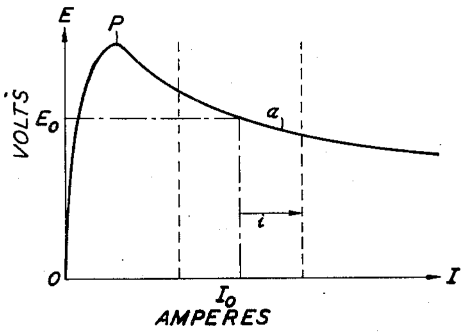
Fig. 1 is a voltage-current plot of a negative resistance element.

The two important elements involved in this application are first, negative resistance elements and, secondly, nonreciprocal transducers, which have different transmission characteristics for the two directions of transmission. The voltage-current plot of a representative negative resistance element is shown in Fig. 1. Note that with a biasing current of $I_0$, when the current increases, the voltage drops, and vice versa. For alternating currents, the device biased at this point may thus be seen to have a negative resistance. Partially because of their critical biased operating conditions, many of the simpler, or elemental, negative resistance elements are quite sensitive, and this tendency toward instability has limited their usefulness.

A four-terminal electrical network is said to satisfy the "Reciprocity Theorem" if "an electromotive force E applied between two terminals produces a current I at two other terminals, and the same voltage E acting at the second point in the circuit will produce the same current I at the first point." As set forth by E. M. McMillan in his article, pages 344 through 347 of volume 18 of the "Journal of the Acoustical Society of America" (1946), a four-terminal linear passive system satisfies the reciprocity theorem if the transfer impedances in each direction are equal. Thus, where the current-voltage relationships on each side of a network are given by the expressions:

$$E_1 = Z_{11}I_1 + Z_{12}I_2$$

and $$E_2 = Z_{21}I_1 + Z_{22}I_2$$

where $E_1$ and $I_1$ are the voltage and current at the input terminals, where $E_2$ and $I_2$ are the voltage and current at the output terminals, and where $Z_{11}$ and $Z_{22}$ are the input and output self impedances and $Z_{21}$ and $Z_{12}$ are the forward and reverse transfer impedances, when the transfer impedances $Z_{12}$ and $Z_{21}$ are equal, the network is said to be reciprocal. Most passive circuit networks do satisfy the Reciprocity Theorem, and are reciprocal. In the present application, however, we will consider certain non-reciprocal transducers which violate the Theorem of Reciprocity in that the transfer impedances differ for the two directions of transmission. One example of a non-reciprocal transducer is a directional phase shifter, which is a circuit element of the four-terminal type which has a different phase shift for one direction of transmission than for the opposite direction of transmission.

Another non-reciprocal transducer, to which repeated reference will be made in the balance of this application, is the "gyrator," a transducer in which the phase shifts differ by 180 degrees for the two directions of propagation. When this type of directional phase shifting transducer is paralleled by normal reciprocal elements having the same phase shift for both directions of transmission, the current flow in the in-phase direction is enhanced while that in the out-of-phase direction is canceled, either partially or completely. This type of unit which transmits or conducts alternating current signals with less loss in signal amplitude for one direction than for the other will be termed a "directional transducer." It further appears that my alternating negative resistance elements and "directional transducers" of this type, the sensitive negative resistances are effectively stabilized through isolation, and will thus be of much greater utility than they have been up to the present time.

Proceeding now to a more detailed consideration and analysis of the invention as shown in the drawings, Fig. 1 is a plot of the voltage-current characteristic of a representative negative resistance element. In particular, it is that of the high speed thermistor disclosed in application Serial No. 199,868, of J. A. Becker and M. C. Waltz, filed December 8, 1950, now Patent 2,740,940 granted April 3, 1956. With the thermistor biased at a current of $I_0$ amperes, it will be noted that a slight increase of current will result in a decrease of voltage across the thermistor instead of the normal increased voltage drop found in positive resistance elements. As is developed in more detail in the above-noted application of Becker and Waltz, the particular high speed thermistor plotted in Fig. 1 exhibits this negative resistance characteristic up to about 100 kilocycles.

Another negative resistance element is the gas diode. At wave guide frequencies negative resistance elements of the type disclosed or referred to in Patent No. 2,308,523 to F. B. Llewellyn, and which issued January 19, 1943, would be suitable. For very high frequency work, however, the negative resistance characteristic resulting from transit time effects across a thin layer of a semiconductor such as germanium may also be employed. This latter type of negative resistance element is disclosed in Patent No. 2,569,347, which issued to W. Shockley on September 25, 1951. E. W. Harold in an article in volume 23, No. 10, page 1201 of the Proceedings of the I. R. E. mentions many other devices for obtaining negative resistance which could also be used in circuits in accordance with the present invention.

Figure 2:
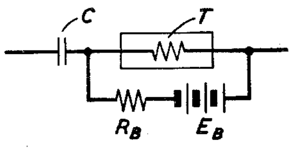
Fig. 2 is the circuit of a negative resistance unit.

In Fig. 2, the components of a negative resistance element corresponding to the plot of Fig. 1 are shown. The biasing current for the thermistor T is supplied by the direct current voltage source $E_B$ through the resistance $R_B$. The bypass condenser C confines the thermistor biasing current to the local circuit. In the drawings, the symbol for a regular resistance and the designation $-R_N$ will be used to indicate negative resistance elements of any of the types mentioned in the preceding paragraphs.

Figure 3:
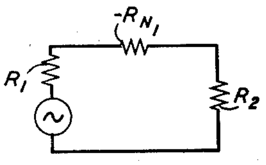
Figs. 3, 4 and 5 show known circuits employing negative resistances in series, shunt and combination arrangements, respectively.
Figure 4:
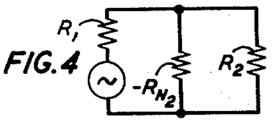

The simplest methods for obtaining gain with negative resistance elements are shown in the series and shunt arrangements of Figs. 3 and 4, respectively. Negative resistance elements are classified as series stable or shunt stable and have to be used respectively in the series or shunt arrangements such as shown in Figs. 3 and 4. For the series arrangement the current amplification obtained by introducing a negative resistance $R_{N_1}$ between the signal source with its resistance $R_1$ and the load resistance $R_2$, which are designated terminating resistances, is given by $$\frac{i'_1}{i_1}=\frac{R_1+R_2}{R_1+R_2-R_{N_1}}$$

where $i_1$ is the current without, and $i'_1$ is the current with the negative resistance $R_{N_1}$ in the circuit. Hence, if $R_{N_1}$ nearly annuls the sum of $R_1$ and $R_2$, a very high gain is obtained. In the shunt case of Fig. 4 where $i'_2$ and $i_2$ are the currents with and without negative resistance, the gain is given by $$\frac{i'_2}{i_2}=\frac{(R_2-R_{N_2})(R_1+R_2)}{R_1R_2-(R_1+R_2)R_{N_2}}=\frac{\frac{R_2-R_{N_2}}{R_1}}{\frac{R_1R_2}{R_1+R_2}-R_{N_2}} \quad (2)$$

Hence, if $R_{N_2}$ is slightly larger in magnitude than $R_1R_2/(R_1+R_2)$, a stable gain is also obtained.

Figure 5:
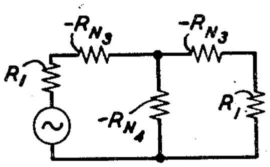

However, gain obtained this way depends to a large extent on the stability properties of the negative resistance elements and also on the load. For example, to obtain a stable gain of 60 db which corresponds to a ratio of $i'_2/i_2$ of 1000 to 1 then it may be seen from Equation 1 that $R_{N_1}$ must equal $.999(R_1+R_2)$ and may not increase by as much as .1 percent. Any small change in $R_{N1}$ or $(R_1+R_2)$ such as would make the total circuital resistance negative will cause the device to sing or oscillate, and a slightly lesser change in this direction would change the gain by large factors. The same situation is true for any combination of negative and positive impedance elements. For example considering the T network of negative resistance elements between two equal terminating resistances $R_1$ as shown in Fig. 5, it is readily shown that the gain obtained by inserting them between the two resistances $R_1$ is $$\frac{i'_2}{i_2}=\frac{[-2R_{N_4}][R_1]}{[R_1-R_{N_3}][R_1-R_{N_3}-2R_{N_4}]} \quad (3)$$

A large stable gain is obtained when $R_{N_3}<|R_1|$ and $R_{N_4}>|R_1-R_{N_3}|$. If a gain of 60 db is to be obtained, the most stable arrangements of negative resistance elements will be when $R_{N_3}=-.967\,R_1$ and $2R_{N_4}$ is equal to $-1.033\,(R_1-R_{N_3})$. Under these conditions the gain is equal to $$\frac{i'_2}{i_2}=\frac{1.033(R_1-R_{N_3})R_1}{(R_1-R_{N_3})(R_1-R_{N_3}-2R_{N_4})}=\frac{1.033R_1}{R_1-R_{N_3}-2R_{N_4}} \quad (4)$$

and the sum of the negative resistance terms of Equation 4 may not exceed 0.001 or 0.1 percent of the above-noted values, and no gain in stability is obtained by dividing the amplifying process between several negative resistance elements. For purposes of later comparison, it will further be noted that each of two series connected equal negative resistances may not increase by more than 0.2 percent for a stable 60-decibel gain.

Figure 6:
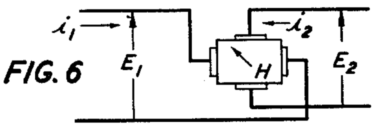
Fig. 6 represents a Hall effect directionally asymmetric element or "gyrator"
Figure 7:
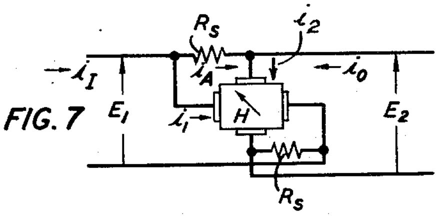
Fig. 7 illustrates a non-reciprocal or unidirectional circuit employing a Hall effect "gyrator"

Bypassing Figs. 6 and 7 for the moment, Figs. 8 through 11 illustrate circuits designed in accordance with the invention. In these arrangements, the instability which has plagued circuits using simple negative resistances has been overcome. Negative resistances are cascaded into high gain stable amplifiers, variations of terminating impedances have a negligible effect on the sensitive negative resistances, and many other advantageous results are secured. The means of securing these remarkable ends is the association with the negative resistances of the passive directional transducers mentioned above. As shown in Figs. 8 through 11, these inexpensive, unilaterally conducting four-terminal networks have been found to effectively isolate negative resistances from undesired unstabilizing effects.

One method for obtaining such non-reciprocal networks is the Hall effect plate or gyrator which is described in W. P. Mason's application Serial No. 219,342 now Patent 2,649,574, filed April 5, 1951, now Patent 2,649,574, granted August 18, 1953. It may readily be shown that the gyrator alone, if symmetrical, can be represented by equations of the type $$E_1=R_{11}i_1+R_{12}i_2 \qquad (5)$$
$$E_2=R_{21}i_1+R_{11}i_2$$

where $R_{21}=-R_{12}$ and that these values of resistance are independent of the frequency up to $10^{10}$ cycles or higher. With a permanent magnet giving a field of 17,500 Gauss, and using a germanium Hall element .220 inch square and .045 inch thick, values of $R_{11}=340$ ohms and $R_{21}=78$ ohms were obtained. The actual values of $R_{11}$ depend on the shape and resistivity of the material but the ratio $R_{11}/R_{21}$ is fixed by the nature of the material and the value of the magnetic field. Fig. 6 shows the voltages and currents. The insertion loss of such a gyrator between matching resistances is 18.9 db in either direction.

To get transmission in one direction but not in the other, the input and output terminals are connected by the shunt resistance Rs. With the currents and voltages directed as shown by Fig. 7, the equations in addition to (5) are $$i_I=i_1+i_A;\quad i_0=i_2-i_A;\quad E_1=2i_AR_S+E_2 \qquad (6)$$

Introducing these equations in (5) and solving for $E_1$ and $E_2$ in terms of $i_I$ and $i_0$, we find the following expressions for the overall unit shown in Fig. 7:

$$E_1=i_IR'_{11} \qquad (7)$$
$$E_2=i_0R'_{11}+i_IR'_{21}$$

where $$R'_{11}=\frac{R_{11}^2+R_{21}^2}{R_{11}+R_{21}}$$

$$R'_{21}=\frac{2R_{21}(R_{11}^2+R_{21}^2)}{(R_{11}+R_{21})^2}$$

That is, there is a coupling resistance $R'_{21}$ in one direction but no coupling resistance $R'_{12}$ in the other. The value of the shunt resistance $2R_S$ that causes this balance is $$2R_S=\left(\frac{R_{11}^2+R_{21}^2}{R_{21}}\right) \qquad (8)$$

With this value of shunt resistance the transducer of Fig. 7 (including the Hall effect gyrator and the shunt resistances) has a transfer impedance which includes equal reciprocal and non-reciprocal components. For one direction of transmission of alternating current signals, the reciprocal component and the non-reciprocal, or gyrator, component are additive. For the opposite direction of transmission, however, the sign of the gyrator component is reversed, and it substantially cancels out the reciprocal component of the transfer impedance.

The insertion loss caused by inserting the balanced gyrator between two terminating resistances equal to the self resistance $R'_{11}$ is given by the Equation 9:

$$\frac{i'_2}{i_2}=\frac{R'_{21}}{2R'_{11}}=\frac{111}{596}=0.186 \qquad (9)$$

or 14.6 db with the values of $R_{11}=340$ ohms; $R_{21}=-R_{12}=78$ ohms. This represents a gain of 4.3 db over the gyrator alone due to the additional transmission through the shunting resistance Rs. For the other direction $R'_{21}$ is replaced by $R'_{12}$ but since this is zero in Equation 7 the loss in the back direction is infinite; actually about 60 db difference occurs between the transmission in the two directions, with the circuital arrangement as set forth above.

In addition to Hall effect plates, directional transducers may be made of other elements. In the McMillan article cited above, for example, a mechanically coupled crystal and magnetic transducer unit is shown to have gyrator properties over a restricted band of frequencies. Other alternatives are suggested in C. L. Hogan's article on "The microwave gyrator," pages 1–31 of the Bell System Technical Journal, volume XXXI, January 1952. This article also discusses at page 25 a particular type of directional transducer for use at microwave frequencies which employs a directional plane of polarization shifting element of the Faraday effect type. In this connection, it is interesting to note that a polarizing force, which in several of the present examples is a magnetic field, acting asymmetrically on an element in the transmission path, constitutes the physical basis for the unilateral conducting properties of these directional transducers of the Faraday and Hall effect types. The possibility of making certain other specific unidirectionally conducting transducers is set forth in the McMillan article and also W. P. Mason at pages 344–356 of his book entitled "Electromechanical Transducers and Wave Filters," 2nd edition, D. Van Nostrand Co., Inc., 1948. It may be noted that the McMillan balanced gyrator arrangement is only precisely balanced and unidirectional at a single frequency, although it will have useful non-reciprocal properties over a broader range. Similarly, the non-reciprocal qualities of the Hall effect gyrator plus resistances would be useful even if impedance deviations prevented an exact balance. The term directional transducer will thus include a gyrator and the additional elements or modified structure required to make it transmit better in one direction than the other. This term will include balanced gyrators, which are substantially unilaterally conducting transducers including a gyrator. The symbol for directional transducers of any of the types noted above will be a box with a symbol $$\underset{\rightarrow}{G}$$

in it, with the arrow indicating the direction of better conduction. The more restricted term "directional gyrator transducer" will indicate a directional transducer including a gyrator element.

Figure 8:
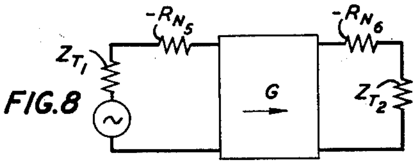
Fig. 8 depicts the use of a non-reciprocal circuit separating two series negative impedances.

Introducing series negative resistances $R_{N_5}$ and $R_{N_6}$ at the two ends of the balanced gyrator, as shown in Fig. 8, the insertion loss caused by inserting the combination between the two terminal impedances $Z_{T_1}$ and $Z_{T_2}$ is equal to $$\frac{i'_2}{i_2}=\frac{R'_{21}(Z_{T_1}+Z_{T_2})}{[R'_{11}+Z_{T_1}-R_{N_5}][R'_{11}+Z_{T_2}-R_{N_6}]} \qquad (10)$$

If the terminating impedances are resistances and the negative resistances $R_{N_5}$ and $R_{N_6}$ are adjusted till the sum $$R'_{11}+R_{T_1}-R_{N_5}=\Delta R_1 \qquad (11)$$

and similarly $$R'_{11}+R_{T_2}-R_{N_6}=\Delta R_2 \qquad (12)$$

the transmission loss (which will be a gain if $\Delta R_1$ and $\Delta R_2$ are small) becomes $$\frac{i'_2}{i_2}=\frac{R'_{21}(R_{T_1}+R_{T_2})}{\Delta R_1\times\Delta R_2} \qquad (13)$$

and the gain introduced by each negative resistance is independent of the other. Hence the gains can be cascaded without introducing any more instability than occurs for each negative resistance by itself.

In particular, if a gain of 60 decibels is divided between the two stages of amplification including $R_{N_5}$ and $R_{N_6}$, then neglecting gyrator losses, each negative resistance need only to be held to approximately 3.2 percent to prevent oscillation, as compared with the figure of 0.2 percent developed hereinbefore for the condition when the non-reciprocal gyrator element is not interposed. Even with the relatively high loss gyrators presently available, improvement in stability by a factor of 5 is realizable in a mere two-stage amplifier.

Figure 9:
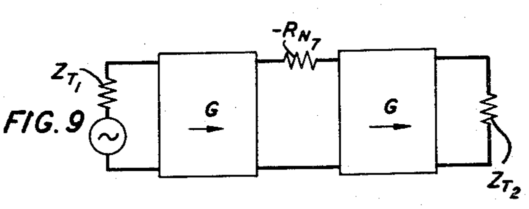
Fig. 9 shows two non-reciprocal circuital units effectively isolating a negative resistance.
Figure 10:
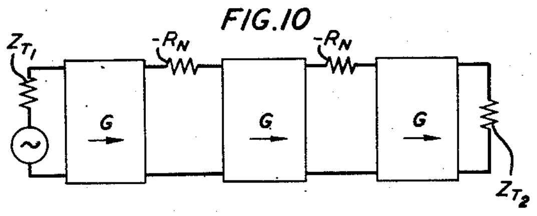
Figs. 10 and 11 show plural stage amplifiers employing series and shunt type negative resistances, respectively.

It will be noted from Equation 10 that if there is any reactive component in the terminal resistance, the sum of $R'_{11}+Z_{T_1}-R_{N_6}$ cannot be made to approach zero. By using a gyrator before the negative resistance and one after the negative resistance, as shown by Fig. 9, the insertion loss of the combination can be shown to be equal to $$\frac{i'_2}{i_2}=\frac{R_{21(1)}R_{21(2)}(Z_{T_1}+Z_{T_2})}{[R_{11(1)}+Z_{T(1)}][R_{11(1)}+R_{11(2)}-R_{N_7}][R_{11_2}+Z_{T_2}]} \quad (14)$$

where $R_{11(1)}$ and $R_{21(1)}$ are the constants of the first gyrator, $R_{11(2)}$ and $R_{21(2)}$ those of the second gyrator and $Z_{T_1}$ and $Z_{T_2}$ the terminating impedances. Hence by making the sum of $$R_{11(1)}+R_{11(2)}-R_{N_7} \quad (15)$$

small, a large gain can be obtained irrespective of the values or variations of the terminal impedances $Z_{T_1}$ and $Z_{T_2}$. Hence the negative resistance is effectively isolated from the effects of the terminations. By introducing more gyrators with negative resistances between them as shown in Fig. 10, gain can be cascaded without regard to the terminations with the stability depending only on sums of the type shown by Equation 15.

Figure 11:
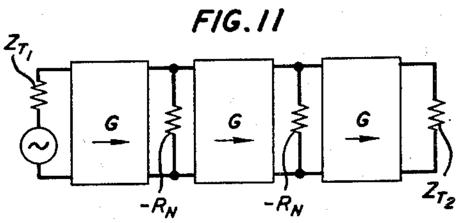

Similar results can be obtained with cascaded shunt type negative resistances as shown in Fig. 11. An equation similar to (14) for the gain of introducing a shunt negative resistance between two balanced gyrators is $$\frac{i'_2}{i_2}=\frac{R_{21(1)}R_{21(2)}(Z_{T_1}+Z_{T_2})}{(R_{11_1}+Z_{T_1})\left(R_{11_1}+R_{11_2}-\frac{R_{11_1}R_{11_2}}{R_N}\right)(R_{11_2}+Z_{T_2})} \quad (16)$$

Hence a high gain independent of the terminations is obtained when $$R_N \text{ is slightly larger than } \frac{R_{11_1}R_{11_2}}{R_{11_1}+R_{11_2}} \quad (17)$$

The foregoing is an analysis of the value of applicant's contribution as applied to some of the systems illustrated in the drawings. Summarizing the more important advantages of this type of circuit, as developed above, it appears that terminal impedance variations can be isolated, negative resistances can be used as amplifiers even when the terminal impedance is highly reactive, and sensitive negative resistances may be cascaded without adverse interaction from impedance changes in other stages. The usefulness of the invention over a broad frequency band extending into microwave frequencies is also considered worthy of reiteration.

It is to be understood that the above-described arrangements are illustrative of the application of the principles of the invention and that numerous other arrangements may be devised by those skilled in the art without departing from the spirit and scope of the invention.

A related application of William Shockley, Serial Number 303,642 was filed concurrently with the present application. An application of C. L. Semmelman, Serial Number 307,263, filed August 30, 1952, also deals with related subject matter.

What is claimed is:

1. In an alternating current signal circuit, a two terminal negative resistance, means for coupling said negative resistance in linear amplifying relationship with said alternating current signal circuit, and a directional transducer interposed in said signal circuit, said transducer including a gyrator and a reciprocal signal transmission path connected to said signal circuit in such bridging relationship with said gyrator as to increase the amplitude of signals transmitted through said signal circuit in one direction and substantially cancel signals transmitted in the other direction, the reciprocal component of the transfer impedance of said transducer being substantially equal to the gyrator component of the transfer impedance.

2. In an alternating current signal circuit, a plurality of directional transducer devices each including a gyrator interposed in said signal circuit and a reciprocal signal transmission path connected to said signal circuit in such bridging relationship with said gyrator as to increase the amplitude of signals transmitted through said signal circuit in one direction and substantially cancel signals transmitted in the other direction, the reciprocal component of the transfer impedance of said transducer being substantially equal to the gyrator component of the transfer impedance, a plurality of two terminal negative resistances, and means for coupling said negative resistances in linear amplifying relationship with said alternating current signal circuit at points which are separated by said directional transducer devices.

3. In an alternating current signal circuit, a two terminal negative resistance, means for coupling said negative resistance in linear amplifying relationship with said alternating current signal circuit, and a directional transducer device interposed in said signal circuit, said directional transducer including a gyrator and a reciprocal signal transmission path connected to said signal circuit in such bridging relationship with said gyrator as to increase the amplitude of signals transmitted through said signal circuit in one direction and reduce the amplitude of signals transmitted in the other direction, the reciprocal component of the transfer impedance of said transducer being of the same order of magnitude as the gyrator component of the transfer impedance and having such a value as to prevent oscillations in said signal circuit.

4. In an alternating current signal circuit, a two terminal negative resistance, means for coupling said negative resistance in linear amplifying relationship with said alternating current signal circuit, and a directional transducer interposed in said signal circuit, said transducer including a Hall effect gyrator unit having two input terminals and two output terminals connected in said alternating current signal circuit, a first shunt resistance connected between one input terminal and one output terminal of said gyrator unit, and a second shunt resistance connected between the other input terminal and the other output terminal of said gyrator unit, each said shunt resistance having the following value:

$$R_s=\frac{R_{11}^2+R_{21}^2}{2R_{21}}$$

where $R_{11}$ is the resistance between two input or two output terminals, and where $R_{21}$ is the transfer resistance between the input and output terminals of the gyrator unit.

References Cited in the file of this patent

UNITED STATES PATENTS

| | | |
|---|---|---|
| 2,553,490 | Wallace | May 15, 1951 |
| 2,585,571 | Mohr | Feb. 12, 1952 |
| 2,647,239 | Tellegen | July 28, 1953 |
| 2,649,574 | Mason | Aug. 18, 1953 |
| 2,697,759 | Tellegen | Dec. 21, 1954 |

OTHER REFERENCES

The Gyrator, Tellegen, Phillips Research Report 3, pp. 81–101, April 1948 (see especially p. 88).